No. 698,661. Patented Apr. 29, 1902.
T. DUNCAN.
MOTOR METER.
(Application filed Sept. 23, 1899. Renewed Nov. 15, 1901.)

(No Model.) 4 Sheets—Sheet 1.

Witnesses
Samuel R. Bachtel
C. E. Hubert

Inventor:
Thomas Duncan
By his Attorneys
Charles A. Brown & Cragg

No. 698,661. Patented Apr. 29, 1902.
T. DUNCAN.
MOTOR METER.
(Application filed Sept. 23, 1899. Renewed Nov. 15, 1901.)

(No Model.) 4 Sheets—Sheet 2.

Witnesses
Samuel A. Bachtel
C. E. Hubert

Inventor
Thomas Duncan
By his Attorneys
Charles A. Brown & Cragg

No. 698,661. Patented Apr. 29, 1902.
T. DUNCAN.
MOTOR METER.
(Application filed Sept. 23, 1899. Renewed Nov. 15, 1901.)

(No Model.) 4 Sheets—Sheet 4.

Witnesses
Samuel A. Bachtel
C. E. Hubert

Inventor:
Thomas Duncan.
By his Attorneys
Charles A. Brown + Cragg

United States Patent Office.

THOMAS DUNCAN, OF CHICAGO, ILLINOIS, ASSIGNOR TO THE SIEMENS & HALSKE ELECTRIC COMPANY OF AMERICA, OF CHICAGO, ILLINOIS, A CORPORATION OF ILLINOIS.

MOTOR-METER.

SPECIFICATION forming part of Letters Patent No. 698,661, dated April 29, 1902.

Application filed September 23, 1899. Renewed November 15, 1901. Serial No. 82,419. (No model.)

*To all whom it may concern:*

Be it known that I, THOMAS DUNCAN, a citizen of the United States, residing at Chicago, in the county of Cook and State of Illinois, have invented a certain new and useful Improvement in Motor-Meters, (Case No. 269,) of which the following is a full, clear, concise, and exact description, reference being had to the accompanying drawings, forming a part of this specification.

My invention relates to motor-meters for measuring electricity, and particularly to direct-current commutated motor-wattmeters, though features of the invention may be embodied in meters not included in this class.

My invention has for its objects, first, so to construct and arrange the parts of the meter that it will occupy but little room; second, to make the revoluble elements of the meter very light without impairing their strength; third, to construct a meter capable of operation while being jarred, thus adapting it for use upon motor-vehicles and electric railroads, and, fourth, to provide means for preventing the retarding-magnets from being subjected to the varying influence of the series winding of the meter.

Other features of the invention will be set forth hereinafter.

I will explain my invention particularly by reference to the accompanying drawings, illustrating the preferred embodiment thereof, in which—

Figure 1:
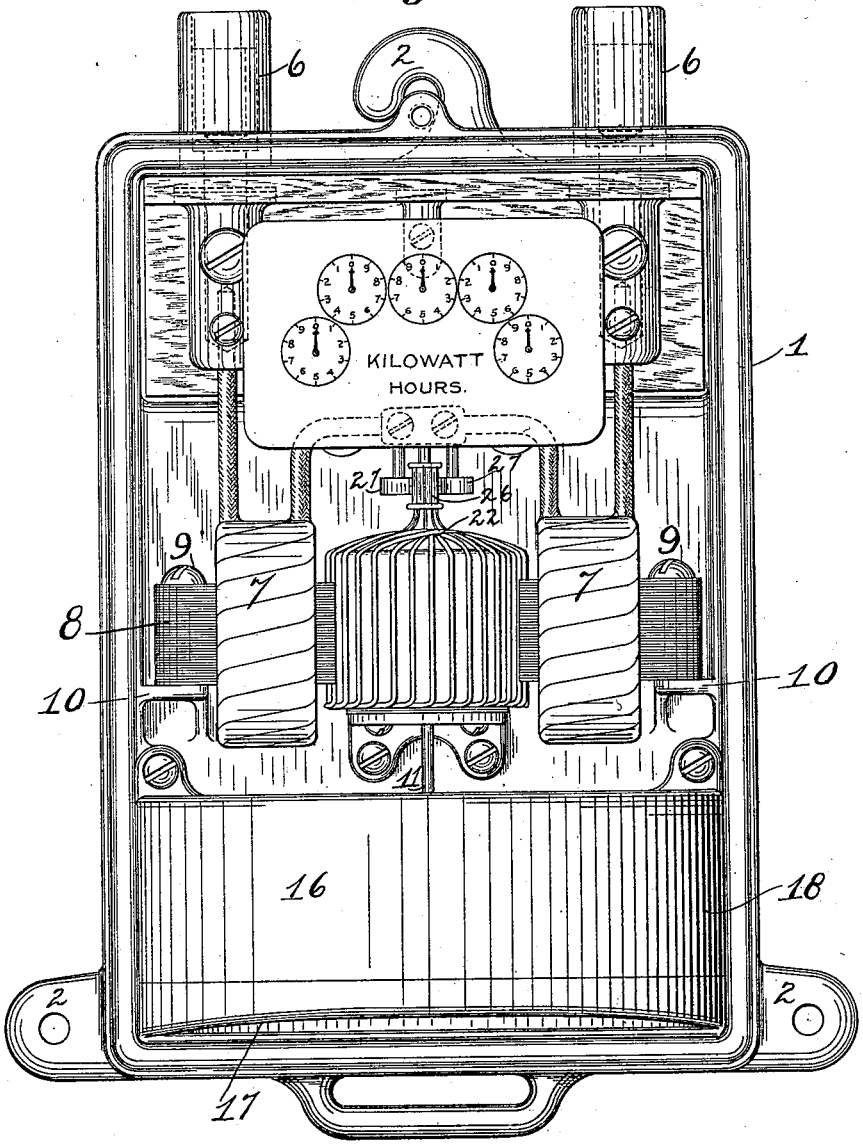
Figure 2:
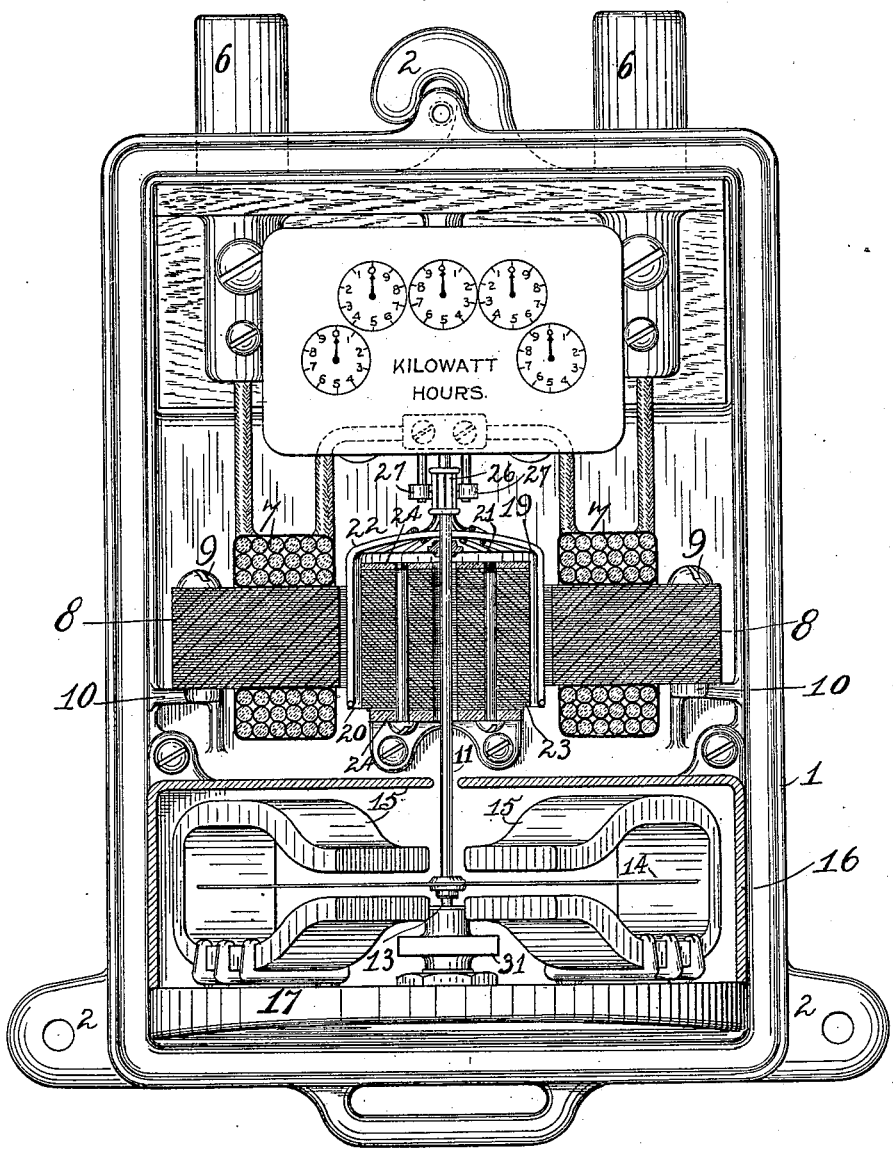
Figure 3:
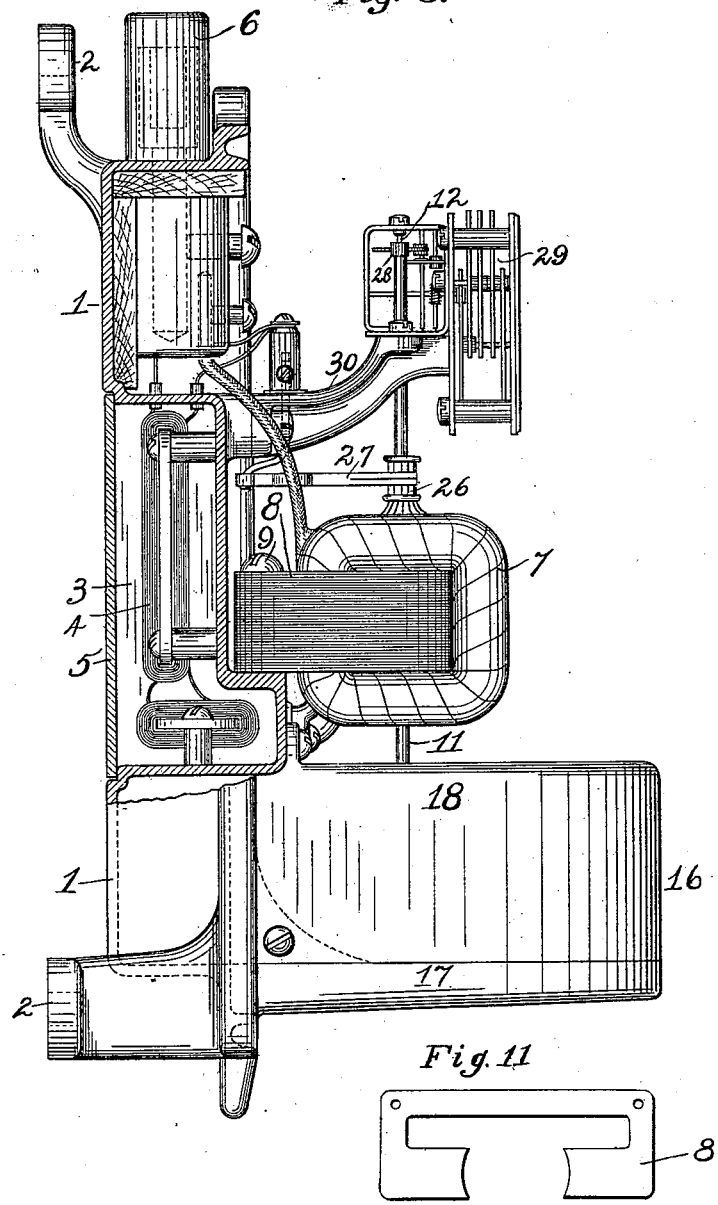
Figure 4:
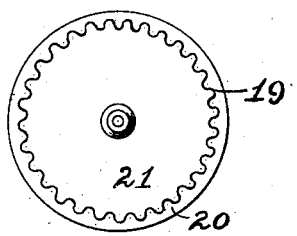
Figure 5:
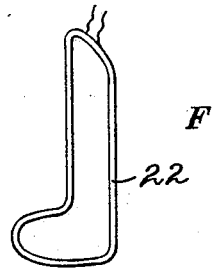
Figure 6:
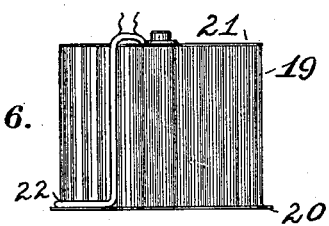
Figure 7:
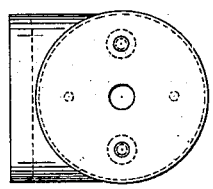
Figure 8:
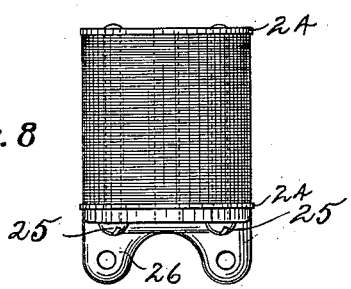
Figure 9:
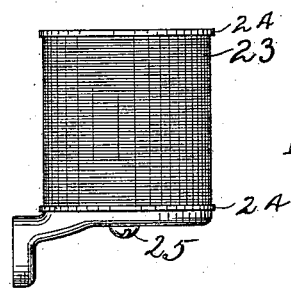
Figure 10:
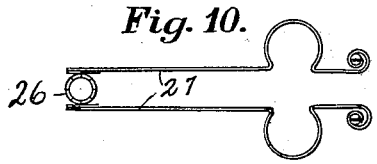

Figure 1 is a front elevation of my improved meter, the casing being removed. Fig. 2 is a view similar to Fig. 1, parts being shown in vertical section. Fig. 3 is a side view of the meter. Fig. 4 is a plan view of the support for the armature-wire. Fig. 5 is a perspective view of a formed coil, such as I preferably employ in the construction of the armature. Fig. 6 is a side elevation of an armature-wire support with a single formed coil in place. Fig. 7 is a plan view of the laminated iron core which I preferably inclose by the armature. Figs. 8 and 9 are respectively front and side views of the core shown in Fig. 7. Fig. 10 is a plan view showing the commutator and its brushes. Fig. 11 is a plan view, on a reduced scale, of the series-winding core.

Like parts are indicated by similar characters of reference throughout the different views.

A back plate 1, constituting a support for the meter, is provided with suitable supporting devices 2 2, by which the meter may be secured in a vertical position. The middle portion of the back plate projects forwardly to form a recess 3, in which the resistance 4, that is included in series with the armature-winding in bridge of the working conductors, is contained. A cover 5 serves to close the recess 3. Binding-posts 6 6 are mounted upon the back plate for connection with the working conductors and serve to include the same in series with the series field-winding 7 of the meter, which produces a field proportional to the flow of current. The series winding is preferably subdivided into two coils, as shown most clearly in Figs. 1 and 2. A magnetic core 8 is provided, upon inwardly-extending portions of which the coils of the series winding are disposed. This core is mounted upon the back plate by means of screws 9 9, passing through the core into lugs 10 10, projecting forwardly from the back plate. The core 8 is preferably made up of thin sheets of steel, so that changes in the current passing through the series winding will immediately give rise to corresponding magnetic effects in the core. The series winding is included in series between the motor and storage battery when the meter is carried upon automobiles and in series between the motor and trolley when the meter is carried upon electric-railway cars.

The armature, which I will fully describe later and which produces a field proportional to the voltage, is mounted upon a spindle 11, which, contrary to usual practice, has an upper jewel-bearing 12, Fig. 3, as well as the usual lower bearing 13. By the provision of the upper jewel-bearing the spindle will not be injured nor will the parts be displaced by the vertical movement of the spindle occasioned, for example, by the jolting of an electrical vehicle carrying the meter. I provide a disk 14, preferably upon the lower end of the shaft 11, which acts as one member of the retarding device, the other member being in the form of two permanent magnets 15 15, between whose poles the disk is placed, as shown most clearly in Fig. 2. In order to prevent the series winding from having a weakening influence upon the braking-magnets 15, I inclose the magnets in a case 16, formed, preferably, of cast-iron, this protecting case or shield being interposed between the series winding and the said magnets, as shown most clearly in Fig. 2. The shield is preferably formed of a base portion 17, formed integrally with the back plate 1, and a cover 18, secured in place by means of screws. The top of the cover 18 is provided with a slot extending from the spindle to the back plate, through which the spindle passes and which is large enough to permit of lateral deflection of the spindle. By the provision of the magnetic shield for the permanent magnets I am enabled to place series windings very close to the said magnets without danger of having the varying magnetic effects due to the said windings weakening the permanent magnets, whereby the meter may be made very compact, which is especially desirable where the meters are to be carried upon vehicles.

I will next describe the construction of the armature by reference particularly to Figs. 1, 2, 4, 5, and 6. I do not form the support for the armature-wire of a solid body, as has heretofore been the practice in the construction of direct-current meters. I preferably construct the support in the form of a cylinder or cup 19, provided with a rim or flange 20 at its lower portion and a cap 21 at its top, which cap may be secured at its center to the spindle. The armature-support may be made of any suitable material, as wood, rubber, sheet-steel, or sheet German silver. I prefer wood or rubber. In order to make the armature-support extremely light, I preferably flute the cylindrical portion thereof, which imparts rigidity thereto and affords means for securely engaging the armature-wire in place. The armature-winding is preferably composed of independently-formed coils 22, which are first separately shaped in the form of circles or other suitable shape, after which they are bent to engage the vertical recesses afforded by the corrugated or fluted support 19, as indicated clearly in Fig. 6, the lower part of each coil resting on the rim 20. The coils after being assembled upon the support may be readily secured in place. By constructing the armature in this way I am not only able to make it light, but I am also able to provide a simple means for retaining the armature-coils in firm engagement with their support when the speed of the armature is suddenly changed upon a short circuit or a sudden overload, as frequently occurs in the operation of electric vehicles. By this formation of the armature I am also enabled to provide a hollow interior therein in which a core 23 of magnetic material may be snugly fitted to increase the magnetic density of the field in which the armature operates. I believe this to be new with me in the construction of direct-current meters. The core 23 is preferably constructed of thin sheet-steel, end plates 24 24 being employed, between which the core-plates are assembled, screws 25 serving to clamp the core firmly between the end plates. The core is mounted upon a shaft 26, extending forward from the back plate. There is just a running clearance between the series poles and the outer diameter of the armature and between the inner diameter of the armature and the stationary core 23 for the purpose of securing the greatest possible density with the least expenditure of energy.

The terminals of the armature-coils are connected with the commutator 26, against which the commutator-brushes 27 rest. These commutator-brushes are preferably formed of strip metal and are spirally formed at the ends that are to be anchored. The brushes are preferably curved each throughout a portion of its length, as indicated most clearly in Fig. 10, whereby the said brushes are more firmly secured in the planes in which they should lie. The brushes are connected in the ordinary manner in series with the resistance 4, and included between and also in series with them are the coils 22 of the armature, the resistance and armature being connected in bridge between the working conductors.

The upper end of the spindle 11 carries a pinion 28, which meshes with the counting-train 29. In order to facilitate the removal of the rotating parts, the counting-train 29 is mounted upon an arm 30, which is removably secured to the back plate by screws. The forward end of this arm supports the counting-train before the shaft or spindle and above the commutator. In removing the armature the screw 31, Fig. 2, is loosened and the arm 30 is removed.

It is obvious that changes may readily be made in the embodiment of my invention herein shown and particularly described without departing from the spirit of the invention, and I do not, therefore, wish to be limited to the precise construction shown; but,

Having thus described my invention, I claim as new, and desire to secure by Letters Patent, the following:

1. In a direct-current motor-meter, the combination with a hollow armature having windings, of a commutator having its segments connected with the said windings, a core of magnetic material extending within the armature, a field-winding, and a measuring device operated by the armature, substantially as described.

2. In a direct-current meter, the combination with a hollow rotatable armature having windings, of a commutator having its segments connected with the said windings, means for establishing and maintaining a field comprising two members, namely; a field-winding and a magnetic core for increasing the magnetic density of the field in which the armature is disposed, one of the said members being located within the interior of the armature, and a measuring device operated by the armature, substantially as described.

3. In a direct-current meter, the combination with a hollow rotatable armature having windings, of a commutator having its segments connected with the said windings, a stationarily-mounted core of magnetic material extending within the armature, a field-winding, and a measuring device operated by the armature, substantially as described.

4. In a direct-current meter, the combination with a hollow rotatable armature having windings, of a commutator having its segments connected with the said windings, means for establishing and maintaining a field comprising two members, namely; a fixed field-winding and a fixed magnetic core for increasing the magnetic density of the field in which the armature is included, one of the said members being located within the interior of the armature, and a measuring device operated by the armature, substantially as described.

5. In a direct-current motor-meter, the combination with a rotatable armature having windings and provided with a hollow interior, of a stationary core of magnetic material extending within the interior of the armature, a field-winding upon the exterior of the armature, and a measuring device operated by the armature, substantially as described.

6. In a direct-current motor-wattmeter, the combination with a hollow rotatable armature provided with windings adapted for inclusion across the working conductors, of a commutator therefor, brushes for engagement with the commutator, a stationary core extending within the armature, a field-winding upon the exterior of the armature adapted for inclusion in series with the working circuit, and a measuring device operated by the armature, substantially as described.

7. In a direct-current motor-wattmeter, the combination with a hollow rotatable armature provided with windings adapted for inclusion across the working conductors, of a commutator therefor, brushes for engagement with the commutator, a stationary core extending within the armature, a field-winding upon the exterior of the armature adapted for inclusion in series with the working circuit, a core for the series winding embracing the armature, and a measuring device operated by the armature, substantially as described.

8. In a direct-current motor-wattmeter, the combination with a rotatable armature in the form of a hollow cylinder provided with windings adapted for inclusion in a bridge conductor across the working conductors, of a commutator for the armature, commutator-brushes for engagement with the commutator, a stationary magnetic core projecting within the interior of the armature, a field-winding upon the exterior of the armature adapted for inclusion in circuit with the working conductors, and a measuring device operated by the armature, substantially as described.

9. In a direct-current motor-wattmeter, the combination with a rotatable armature in the form of a hollow cylinder provided with windings adapted for inclusion in a bridge conductor across the working conductors, of a commutator for the armature, commutator-brushes for engagement with the commutator, a stationary magnetic core projecting within the interior of the armature, a field-winding upon the exterior of the armature adapted for inclusion in circuit with the working conductors, a core for the series field-winding embracing the armature, and a measuring device operated by the armature, substantially as described.

10. An armature, for direct-current meters comprising a fluted or corrugated support, and armature-windings maintained in position by the corrugations in the support, substantially as described.

11. An armature for direct-current meters, comprising a corrugated cylindrical support, and windings adapted to be maintained in place upon the said support by the corrugations therein, substantially as described.

12. An armature for direct-current meters comprising a corrugated cylindrical support, and windings adapted to be maintained in place upon the said support by the corrugations therein, the lower portion of the cylindrical support being provided with a rim for supporting the lower ends of the armature-coils, substantially as described.

13. An armature for direct-current meters, comprising a corrugated support, and armature-coils separately formed and maintained in place by the corrugations in the said support, substantially as described.

14. An armature for direct-current meters, comprising a corrugated cylindrical support and armature-coils, separately formed, and secured in place by their engagement with the corrugations in the said support, substantially as described.

15. An armature for direct-current meters, comprising a corrugated cylindrical support having an outwardly-extending flange, or rim, surrounding the same, and armature-coils, separately formed, secured in place by their engagements with the corrugations in the support and resting at their lower ends upon the said rim, substantially as described.

16. In a direct-current wattmeter, the combination with a series field-winding, of an armature having its coils arranged to form a hollow cylinder, a commutator connected with the coils of the armature, commutator-brushes for the commutator for including the armature in bridge between the mains of a working circuit, and a measuring device operated by the armature, substantially as described.

17. In a direct-current wattmeter, the combination with a field-winding adapted for inclusion in series with the working circuit, of a rotatable armature whose coils are arranged to form a hollow cylinder disposed within the field created by the series field-winding, a commutator for the armature, commutator-brushes for including the armature in the bridge across the working conductors, and a measuring device operated by the armature, substantially as described.

18. As a new article of manufacture, a commutator-brush for direct-current meters, spirally formed at the end that is to be anchored, and curved throughout a portion of its length, substantially as described.

19. As a new article of manufacture, a commutator-brush for direct-current meters, constructed of strip metal, spirally formed at the end that is to be anchored, and curved throughout a portion of its length, substantially as described.

In witness whereof I hereunto subscribe my name this 13th day of September, A. D. 1899.

THOMAS DUNCAN.

Witnesses:
CHARLES A. BROWN,
GEORGE L. CRAGG.